United States Patent [19]
McDonald

[11] Patent Number: 5,156,898
[45] Date of Patent: Oct. 20, 1992

[54] FOLDED SHEET

[76] Inventor: George W. McDonald, Bella Luce, Moulin Huet, St. Martins, Channel Islands, United Kingdom

[21] Appl. No.: 721,910

[22] Filed: Jun. 20, 1991

Related U.S. Application Data

[63] Continuation of Ser. No. 213,582, Jun. 23, 1988, abandoned.

[30] Foreign Application Priority Data

Dec. 30, 1985 [GB] United Kingdom .................. 8531890

[51] Int. Cl.⁵ ........................... B32B 3/08; B32B 3/04
[52] U.S. Cl. ........................................ 428/100; 428/99; 428/130; 428/900; 283/34; 283/106; 281/5
[58] Field of Search ................. 428/100, 130, 900, 99; 283/34, 106; 281/5

[56] References Cited

U.S. PATENT DOCUMENTS

| | | | |
|---|---|---|---|
| 1,687,304 | 10/1928 | Morris | 283/34 |
| 2,118,964 | 5/1938 | Bonnaire | 283/34 |
| 4,477,254 | 10/1984 | Yokayama | 283/34 |
| 4,606,553 | 8/1986 | Nickerson | 283/34 |

FOREIGN PATENT DOCUMENTS 835219 10/1948 Fed. Rep. of Germany .
2168637 8/1973 France .

*Primary Examiner*—Alexander S. Thomas
*Attorney, Agent, or Firm*—McAulay Fisher Nissen Goldberg & Kiel

[57] ABSTRACT

A sheet of paper or like material having a first and a second set of concertina folds with the second set of folds being transverse to the first set when the sheet is folded. The sheet is provided with two stiff portions at diagonally opposite corner segments of the sheet, so that the sheet can be unfolded with a single movement and possibly using only one hand to grasp and unfold the sheet.

16 Claims, 1 Drawing Sheet

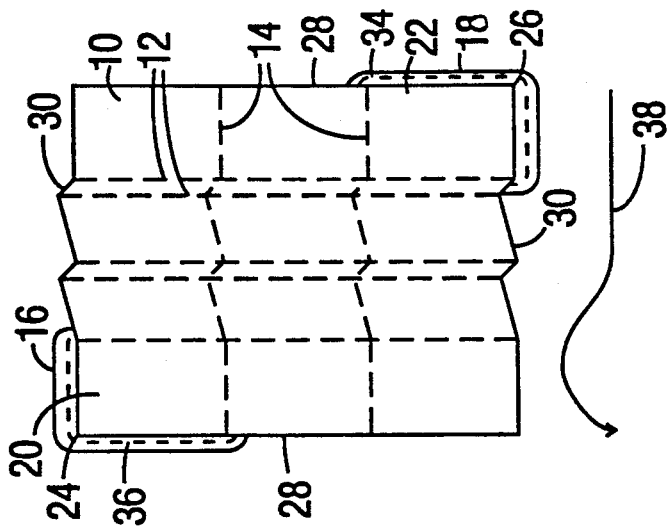
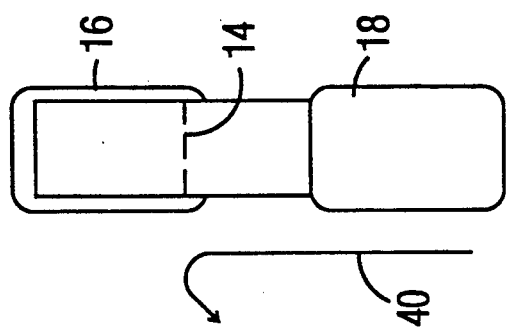
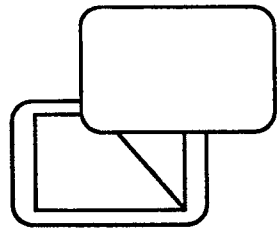
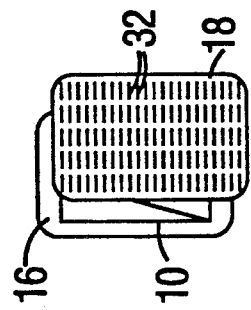
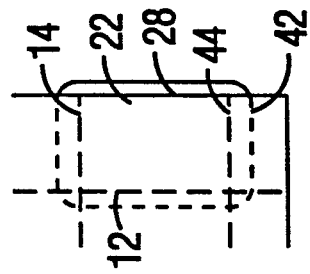

FOLDED SHEET

This application is a continuation of application Ser. No. 213,582, filed Jun. 23, 1988 abandoned.

BACKGROUND

This invention relates to folded sheet material, regardless of whether it is in a folded or unfolded condition.

It is known to fold maps with a first set of vertical concertina folds (which term means that the folds are alternately towards and away from the front of the sheet) and, once the map is so folded, to impose a second set of folds (not concertina) that are horizontal. It is further known for such a map to have a stiffening portion which extends over the whole of one corner segment produced by the folds and beyond this for a similar area outside the map so that when the map has been folded completely the outside stiffened portion can be folded over the map so that the map is wholly contained between the two parts of the stiffened portion that are hinged together.

THE INVENTION

For the purposes of the ensuing description and claims, "sheet material" is hereby defined as sheet material which has folds in it, regardless of whether it is in a folded up condition or not unless the context otherwise requires, and further is a material that takes folds at which it can be easily unfolded (without the folds disappearing) and refolded. It may be paper, or a paper-like material such as plastics sheet on which books are commonly printed, or may be very thin card or any other suitable flexible material. It is conceivable that the sheet material may be stiff except at the folds, e.g. very thin cards interconnected by paper or cloth, but this is deprecated as not allowing full realisation of the advantages of the invention.

The invention consists in a sheet of material as hereinbefore defined having a first set of concertina folds and, so as to be transverse to these when the sheet is folded with these folds, a second set of concertina folds, the sheet being provided with two stiff portions at segments thereof, which are at or near diagonally opposite corners of the sheet and defined by fold/s and/or edge/s thereof.

This enables the sheet of material to be unfolded in a single movement in which one hand graspsone of the stiff portions and the other hand pulls the other stiff portion away from the first one.

Although one or both sets of folds may be non-parallel, e.g. convergent, and/or one or both of the stiff portions may, when the sheet is properly folded, not be outer portions, in a preferred embodiment the sheet is rectangular, the sets of folds being mutually perpendicular and parallel to the respective edges of the sheet, and the stiff portions being such as to be at the outside of the sheet when it has been folded by the first set of folds and then also by the second set of folds and being at least as large as the respective corner segments of the sheet.

In this case, and particularly if the first set consists of an odd number of folds and the second set consists of an even number of folds, one hand can grasp the back stiff portion, while the other hand can grasp the front stiff portion and pull it first downwards and then sideways turning it over, so as to open the sheet with what in practice amounts to a single movement, assuming the sheet to be flexible at and near the folds. By experiment, the most suitable folding for this action has been found to comprise five folds in the first set and two folds in the second set. Furthermore, if the stiff portions are slightly larger than the respective corner segments of the sheet it is easier to grasp the stiff portions. Also it is relatively simple to reverse the action and fold up the sheet again with a single movement. If this facility is then combined with the stiff portions being provided with holding means adapted to hold the portions together to keep the sheet folded, a particularly convenient embodiment is provided, one which can be rapidly unfolded and rapidly refolded and kept in position without undue fiddling. The holding means may comprise oppositely magnetised parts of the respective stiff portions or (though this has not been found so effective) may comprise hooked material and looped material at the respective stiff portions.

The invention is particularly suited to printed sheet material intended to be carried around in the pocket (e.g. for the uses indicated below) for which purpose the folds may divide the material into segments of about 4 to 8 cm. width by about 6 to 12 cm. length. It is preferred that the whole package should be roughly the size of a credit card, i.e. with the folds dividing the material rectangularly into segments of about 5 to 5½ cm. width by about 8 to 8½ cm. length.

In a preferred embodiment, the material (apart from the stiff portions) is paper or paper-like material (e.g. of plastics) and the stiff portions are of semi-rigid material, principally of plastics (e.g. apart from magnetisable material for the purpose mentioned above), attached to the remainder of the material.

An embodiment which has particular uses in awkward situations is produced if at least one of the said diagonally opposite stiff portions (usually the front one) is sufficiently massive to allow single-handed holding and opening of the sheet. In this case, the back stiff portion is held in one hand with the massive front portion resting lightly on the remainder of the folded material and then this is jerked so that the massive front portion flies away from the grasped back portion, thus automatically enabling the sheet to be held and opened, both with one hand.

DESCRIPTION OF THE DRAWINGS

Reference will now be made by way of example to the accompanying drawings in which:

FIGS. 1, 2, 3 and 4 show successive stages of opening, i.e. unfolding, (in that order) of an embodiment of the invention and show in reverse order (as indicated by the arrows) successive stages in closing, i.e. folding up, the embodiment; and FIGS. 1, 4 and 5 show alternative features of embodiments of the invention.

Referring to the drawings, and particularly FIG. 4, a sheet of paper 10, which is a sheet of material as hereinbefore defined, has a first set of concertina folds 12 and, so as to be transverse to these when the sheet is folded with these folds into the position shown in FIG. 3, a second set of concertina folds 14, the sheet being provided with two stiff portions 16,18 at segments 20,22 of the sheet 10, which segments are at or near diagonally opposite corners 24,26 of the sheet and are defined by folds 12,14 and edges 28,30 of the sheet 10.

The sheet 10 is rectangular when flattened, as will be easily inferred from FIG. 4, the sets of folds 12,14 being mutually perpendicular, and parallel to the respective edges 28,30 of the sheet 10, and the stiff portions 16,18 are such as to be at the outside of the sheet 10 when it has been folded by the first set of folds 12 (as seen in FIG. 3) and then also by the second set of folds 14 (as seen in FIG. 1), and the stiff portions 16,18 are at least as large as the respective corner segments 20,22 of the sheet 10.

It will be seen from FIG. 4, that the first set consists of an odd number of folds 12, in fact five of them, and the second set consists of an even number of folds 14, in fact two of them.

For ease of grasping and to protect the sheet 10 and its folds 12,14, as explained above, the stiff portions 16,18 are in fact slightly larger than the respective corner segments 20,22 of the sheet 10, perhaps 2 mm. on each side if the segments are of credit card size, as discussed below (and above).

The stiff portions 16,18 are preferably (for the reasons indicated above) provided with holding means adapted to hold the portions 16,18 together to keep the sheet 10 folded, in the position shown in FIG. 1. A particularly convenient form of the holding means comprises a known magnetic arrangement indicated schematically in FIG. 1, in which small adjacent areas 32 of each stiff portion 16,18 are magnetised with alternate poles on the inside of each stiff portion 16,18, which portions are paired such that oppositely magnetised parts of the portions 16,18 face each other through the folded paper sheet 10. This is a known device and holds the portions 16,18 closely together by magnetic force bridging the eighteen thicknesses of sheet 10 thus clamped between portions 16 and 18. An alternative embodiment is shown in FIG. 4, in which the holding means comprise strips 34,36 of hooked material and looped material (e.g. that known under the trade name VELCRO) at the respective stiff portions 16,18, though this is found in practice to be less convenient than the magnetic feature as it requires a much wider margin of excess size of portions 16,18 over the size of segments 20,22 and much thinner paper sheet 10.

The embodiment is primarily directed to use as a pocket-held device and, as such, its preferred size is with all of the segments shown in FIG. 4, into which sheet 10 is divided by folds 12 and 14, being about 4 and 8 cm. in width and about 6 to 12 cm. in length. The most convenient size is approximately that of a standard credit card, in which case the sheet 10 of material is divided rectangularly into segments of about 5 to 5½ cm. width by about 8 to 8½ cm. length.

Preferably, the stiff portions 16,18 are of plastics material such as is commonly used for credit cards. This enables portions 16 to be grasped in the left hand and portion 18 thrown outwards and downwards, to the right as seen in the drawings, so that sheet 10 opens automatically, going through the positions shown successively in FIGS. 2, 3 and 4. The portion 18 can then be grasped with the right hand and pulled slightly away from portion 16 to hold the sheet stretched and any text thereon easily readable. To close the sheet 10, portions 16 and 18 are grasped in the left and right hands respectively with the palms facing the viewer of FIG. 4 and the portion 18 is then brought with the right hand in a movement indicated by arrow 38 towards the left and turning over portin 18 until it and sheet 10 reach the position shown in FIG. 3. The movement is then continued upwards, over and back as indicated by arrow 40 and successively into the positions shown in FIG. 2 and FIG. 1.

In an alternative embodiment, a border segment 42 is normally kept folded, e.g. to secrete text, and the "corner segment" referred to above is the one marked 22 in FIG. 5. This is then defined by edge 28 and two folds 14 and 44. Fold 44 is not part of the concertina folds 14 as it is in the same direction as the adjacent fold 14 shown in FIG. 5.

By making the whole sheet fold up into a size similar to that of credit cards, it can be placed in a standard credit card wallet. The sheet can comprise one or more maps, can be a phrase sheet, a calorie sheet, a wine sheet (including both data and a map). The sheet may contain business information or lists of E-coded food additives. Important uses of sheets embodying the invention are:

1. Travelling: e.g. maps, phrases, dictionaries, business/executive information.
2. Check-out/shopping: dining, wine, cheese, diet (calorie, salt, cholesterol, -content).
3. Leisure: photography (e.g. instructions), watching (e.g. birds, trees, aeroplanes).
4. Emergency: first-aid, codes.

It is also conceivable that embodiments of the invention, perhaps when the folds are not parallel to each other or are not mutually perpendicular, may constitute magicians' tricks.

I claim:

1. A formed sheet of material comprising:
   a first set of concertina folds and a second set of concertina folds to permit folding of said sheet between an unfolded state and a folded state, said second set of concertina folds being folded in a direction transverse to said first set of concertina folds when said sheet is folded;
   said first and second sets of folds defining segments of said sheet;
   two diagonally opposite stiff portions at segments of said sheet disposed at or near diagonally opposite corners of said sheet and being located on opposed outer surfaces thereof when said sheet is folded; and
   said stiff portions being slightly larger than the respective corner segments of said sheet both when said sheet is in its unfolded state and in its folded state, and being positioned and configured to facilitate grasping of said stiff portions with opposite hands and allow said sheet to be unfolded in a single movement.

2. The formed sheet as claimed in claim 1, wherein said sheet has a rectangular configuration, said first and second sets of folds being mutually perpendicular and parallel to the respective edges of said sheet, said stiff portions being such as to be at the outside of said sheet when it has been folded by said first set of folds and then also by said second set of folds, and said first set of folds being an odd number of folds and said second set of folds being an even number of folds.

3. The formed sheet as claimed in claim 2, wherein said first set of folds consists of five folds and said second set of folds consists of two folds.

4. The formed sheet as claimed in claim 2, wherein said stiff portions include holding means for holding said portions together to keep said sheet folded.

5. The formed sheet as claimed in claim 4, wherein said sheet material apart from said stiff portions being paper or flexible material and said stiff portions being of semi-rigid material attached to the remainder of said sheet material, and at least one of said diagonally opposite stiff portions being sufficiently massive to allow single-handed holding and opening of said formed sheet.

6. The formed sheet as claimed in claim 4, wherein said holding means comprise oppositely magnetized parts of said respective stiff portions.

7. The formed sheet as claimed in claim 4, wherein said holding means comprise hooked material and looped material at said respective stiff portions.

8. The formed sheet as claimed in claim 1, wherein said first and second sets of folds divide said sheet material into segments of about 4 to 8 cm width by about 6 to 12 cm length.

9. The formed sheet as claimed in claim 1, wherein said sheet material apart from said stiff portions is paper or flexible material and said stiff portions is of semi-rigid material.

10. The formed sheet as claimed in claim 1, wherein said stiff portions are of equal size.

11. The formed sheet as claimed in claim 1, wherein said stiff portions are separated by at least two folds in said first set of folds and at least two folds in said second set of folds.

12. The formed sheet as claimed in claim 1, wherein each of said stiff portions has no fold lines.

13. A rectangular formed sheet of material comprising:
   a first set of concertina folds and a second set of concertina folds to permit folding of said sheet between an unfolded state and a folded state;
   said first and said second sets of folds defining segments of said sheet and being mutually perpendicular and parallel to the respective edges of said sheet;
   said second set of folds being folded in a direction transverse to said first set of folds when said sheet is folded; and
   two diagonally opposite stiff portions at segments of said sheet disposed at or near diagonally opposite corners of said sheet and being located on opposed outer surfaces thereof when said sheet is folded;
   said sheet material apart from said stiff portions being paper or flexible material and said stiff portions being of semi-rigid material;
   said stiff portions being of equal size and having no fold lines, and being slightly larger than the respective corner segments of said sheet both when said sheet is in its unfolded state and in its folded state;
   said stiff portions being on the outside of said sheet when it is folded by said first set of folds and then also by said second set of folds;
   said stiff portions being separated by at least two folds in said first set of folds and at least two folds in said second set of folds; and
   said stiff portions being positioned and configured to facilitate grasping of said stiff portions with opposite hands and allow said sheet to be unfolded in a single movement.

14. The formed sheet as claimed in claim 1, further comprising releasably engageable holding means on said stiff portions for holding said portions together to keep said sheet in its folded state.

15. The formed sheet as claimed in claim 1, wherein at least one of said diagonally opposite stiff portions is sufficiently massive to allow single-handed holding and opening of said sheet.

16. The formed sheet as claimed in claim 13, wherein said first set of folds are an odd number of folds and said second set of folds are an even number of folds.

* * * * *